US008867831B2

(12) United States Patent
Mel et al.

(10) Patent No.: US 8,867,831 B2
(45) Date of Patent: Oct. 21, 2014

(54) IMAGE ENHANCEMENT USING MODULATION STRENGTH MAP AND MODULATION KERNEL (71) Applicants: Bartlett W. Mel, Manhattan Beach, CA (US); Chaithanya A. Ramachandra, Los Angeles, CA (US)

(72) Inventors: Bartlett W. Mel, Manhattan Beach, CA (US); Chaithanya A. Ramachandra, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 13/891,007

(22) Filed: May 9, 2013

(65) Prior Publication Data
US 2013/0301912 A1 Nov. 14, 2013

Related U.S. Application Data (60) Provisional application No. 61/644,935, filed on May 9, 2012.

(51) Int. Cl.
G06K 9/00 (2006.01)
G06T 5/00 (2006.01)
G06T 5/20 (2006.01)

(52) U.S. Cl.
CPC ......... *G06T 5/00* (2013.01); *G06T 2207/20192* (2013.01); *G06T 5/003* (2013.01); *G06T 2207/20012* (2013.01); *G06T 2207/10024* (2013.01); *G06T 2207/20028* (2013.01); *G06T 5/20* (2013.01)

USPC ........... 382/162; 382/167; 382/266; 382/254; 382/274; 382/275

(58) Field of Classification Search
USPC .......... 382/162, 167, 166, 254, 260, 274, 275
See application file for complete search history.

(56) References Cited

U.S. PATENT DOCUMENTS

| 2,455,849 | A | | 12/1948 | Yule | |
|---|---|---|---|---|---|
| 4,586,038 | A | * | 4/1986 | Sims et al. | 345/586 |
| 6,692,880 | B2 | * | 2/2004 | Tyagi et al. | 430/108.1 |
| 2012/0288140 | A1 | * | 11/2012 | Hauptmann et al. | 382/103 |

OTHER PUBLICATIONS

Adobe. 2012. Photoshop Elements Help/Sharpening. (Web page captured Sep. 30, 2012, accessed via the Internet Archive on Nov. 14, 2013, http://helpx.adobe.com/photoshop-elements/using/sharpening.html).

(Continued)

*Primary Examiner* — Ali Bayat
(74) *Attorney, Agent, or Firm* — McDermott Will & Emery LLP (57) ABSTRACT An image enhancement system may generate a net signed fractional modulation value at each location in an image using a modulation strength map (MSM) in combination with a modulation kernel $F(\theta)$. The system may scale an image value at each location using the net signed fractional modulation value at each location. Application of the algorithm may not result in systematic clipping of peri-edge locations to maximum or minimum brightness values, or any other form of systematic homogenization of values at peri-edge locations.

18 Claims, 4 Drawing Sheets

(56) References Cited

OTHER PUBLICATIONS

Nik Software, Inc. 2012. Sharpener Pro 3.0. (Web page captured May 12, 2012, accessed via the Internet Archive on Nov. 15, 2013, https://www.niksoftware.com/sharpenerpro/usa/entry.php).

Konishi, S. et al. 2003. Statistical Edge Detection: Learning and Evaluating Edge Cues. IEEE Transactions on Pattern Analysis and Machine Intelligence, vol. 25, No. 1, pp. 57-74. doi:http://do.ieeecomputersociety.org/10.1109/TPAMI.2003. 1159946.

Leat, S.J. et al. 2005. Generic and customized digital image enhancement filters for the visually impaired, Vision Research, vol. 45, No. 15, pp. 1991-2007. doi:10.1016/j.visres.2005.01.028.

O'Brien, V. 1959. Contrast by Contour-Enhancement. The American Journal of Psychology, vol. 72, No. 2, pp. 299-300. doi:10.2307/1419385.

Peli, E. 2002. Feature detection algorithm based on a visual system model. Proceedings of the IEEE 2002, vol. 90, pp. 78-93.

Peli, E.S. et al. 1984. Image enhancement for the visually impaired. Optical engineering, vol. 23, No. 1, pp. 047-051.

* cited by examiner

Narrow in direction parallel to edge

Wide in direction parallel to edge

IMAGE ENHANCEMENT USING MODULATION STRENGTH MAP AND MODULATION KERNEL

CROSS-REFERENCE TO RELATED APPLICATION

This application is based upon and claims priority to U.S. provisional patent application 61/644,935, entitled "Method for Increasing Salience of Images/Videos to Improve Visual Function and Aesthetics," filed May 9, 2012. The entire content of this application is incorporated herein by reference.

STATEMENT REGARDING FEDERALLY SPONSORED RESEARCH

This invention was made with government support under Grant No. EY016093 awarded by the National Institutes for Health/National Eye Institute (NIH/NEI). The government has certain rights in the invention.

BACKGROUND

1. Technical Field

This disclosure relates to image enhancement technology.

2. Description of Related Art

Billions of digital images are taken every day. These are taken using devices such as handheld cameras and phones and video cameras run continuously in cities, buildings, factories, and cars. Trillions of images are already posted on the web for myriad business and personal uses. Given this pervasive and growing role of digital still and video images, technologies that can automatically boost the clarity and visual impact of main objects in these images, both on screen and on paper, can be of great economic significance. However, tools that automatically enhance clarity or salience of images may not target main objects, and may not take best advantage of the cues that are known from perceptual studies to increase apparent contrast between objects and their surrounds.

Human perception of natural objects is primarily based on contours, including occluding boundaries (where an object ends and a background begins), abrupt changes in surface orientation (such as where two faces of a cube meet), and major surface markings (such as the stripes on a zebra). Artists have long known of the importance of contours for visual perception, and therefore use contours to represent objects and scenes in pen-and-ink line drawings. Line drawings involve only a tiny fraction of the original image "pixels," but often contain all of the information needed to rapidly and reliably recognize objects and scenes. However, efforts to enhance images in a way that selectively and flexibly boost main object contours can provide less than optimal results.

One approach to boosting images salience is to increase overall contrast. However, every pixel in the image may be affected. This may lead to marked changes in image appearance. Shadows may be deepened, bright areas may be washed out, and colors may become unnaturally saturated. At the same time, objects may not be emphasized.

Another approach is to selectively boost mid or high spatial frequency bands, as in "unsharp masking" and other sharpening approaches. See Leat, S. J., Omoruyi, G., Kennedy, A., and Jernigan, E. (1005), *Generic and customized digital image enhancement filters for the visually impaired*, Vision Research, Vol. 45, No. 15, pages 1991-2007. doi:10.1016/j.visres. 2005.01.028. This approach may be used to boost details, rather than main objects, to counteract blur caused by low quality lenses or loss of resolution during printing. Concerns with sharpening methods based on spatial frequency filtering may include the fixed relationship between the spatial scale and form of the local image structures that have been targeted by the filtering stage, and the spatial scale and form of the image enhancement itself. For example, when sharp localized structures are targeted in the filtering stage, image enhancement may also be sharp and localized. This may not lead to a desired perceptual effect. Similarly, there may be a simple, monotonic relationship in sharpening between the strength of the image feature and the strength of the image enhancement: stronger image features receive greater enhancement. This may be the opposite of what is wanted: strong edges may not need enhancement but receive it anyway, and weak edges—for example, places along an object boundary where the object blends into the background and local contrast is lost—may need the most enhancement but receive none.

Another approach to enhancing "objects" is the use of an edge detection algorithm to select image locations to boost. Edges may be the elements of object contours. This technique has been used in "smart sharpening" algorithms. But once edges have been identified, the problem may remain that the spatial scale and magnitude of the enhancement is tightly coupled to the spatial scale and magnitude of the underlying image structures.

Once edges have been identified, an alternative use of edges is to superimpose lines on the original image where edges have been located. These lines can be either black, as in a traditional line drawing, or "bipolar" in which both black and white lines are superimposed in pairs on the light and dark sides of the edge. See Peli, E. S. & Peli, T (1984), *Image enhancement for the visually impaired*. Optical engineering, Vol. 23, No. 1, pages 047-051. While the width of the superimposed lines can be varied in such an algorithm according to the choice of the user, the original image pixels are replaced by the enhancement. This may lead to loss of information and can produce an unnatural, cartoon-like appearance.

Another concern that can occur in both sharpening and superimposed line-based approaches is that, as the enhancement level is turned up and begins to measurably increase the salience of the targeted structures, the processed images may begin to take on an undesirable appearance that some viewers may find cluttered or harsh.

The Razor Vision™ Video enhancement cable by Belkin (~$200), follows the above-mentioned filtering-based approach. However, it indiscriminately boosts contrast within a specific spatial frequency range. This may highlight uninformative background textures that can actually impede vision.

SUMMARY

An image enhancement system may include a computer data processing system that includes at least one computer data hardware processor and other computer hardware components. The components of the system may collectively perform various functions in connection with a modulation strength map (MSM) that contains positive or negative values representing a sign and magnitude of modulation to be applied in the vicinity of each of multiple locations in an image at each of multiple orientations for each of the locations, each of the multiple orientations at each of the multiple locations having an image value. The system may generate a net signed fractional modulation value at each of the locations in the image using the MSM in combination with a modulation kernel $F(\theta)$. The generating may be done in accordance with the following algorithm:

at a given location X in the image, and for a given orientation θ, the modulation strength M represented in the MSM is used to scale F(θ); and at every image location, positive and negative contributions are accumulated from all scaled modulation kernels arising from surrounding image locations/orientations, in order to produce a net signed fractional modulation value that represents a fractional increase or decrease to be applied to the image value at that location.

The system may scale an image value at each location using the net signed fractional modulation value at each location. Application of the algorithm may not result in systematic clipping of peri-edge locations to maximum or minimum brightness values, or any other form of systematic homogenization of values at peri-edge locations.

The modulation kernel may be an oriented bipolar function whose values change sign at the border of orientation θ that runs through the kernel center, but are primarily of the same sign on each side of the border.

The modulation kernel may be an oriented bipolar function whose values are peaked on either side of the border of orientation θ that runs through the kernel center, and decay smoothly moving perpendicularly away from the border.

The values of the modulation kernel may decay smoothly along an uninflected asymptotic curve moving perpendicularly away from the border.

The modified image values produced by scaling the original image values by the net signed fractional modulation value may be clipped or compressed so that no resulting value exceeds a maximum allowable image value.

The system may generate the MSM from an edge strength map (ESM) that represents edge strength at each of the multiple orientations at each of the multiple locations by non-monotonic mapping from edge strength to modulation strength.

The signed fractional modulation values may be computed separately at multiple spatial scales for the same image, after which the original image values are modified based on the modulation values combined across spatial scales.

The image may have different types of edges. A different set of ESMs, MSMs, and modulation kernels may be used in the scaling step to scale the locations that comprise each different type of edge.

The value at each location may represent brightness, hue, or saturation. The scaling may scale the brightness, hue, or saturation values.

A non-transitory, tangible, computer-readable storage medium may contain a program of instructions that may cause the computer data processing system to implement any combination of the functions described herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

An image enhancement system may automatically modulate images so that border contrast is manipulated in systematic ways. One application may be to enhance the salience of main object boundaries in images, while leaving texture edges unaffected or suppressed. However, a great deal of flexibility exists to manipulate boundaries selectively both in magnitude and direction, based on their orientation, strength, scale, and feature type.

Format of Input Images

Figure 1:
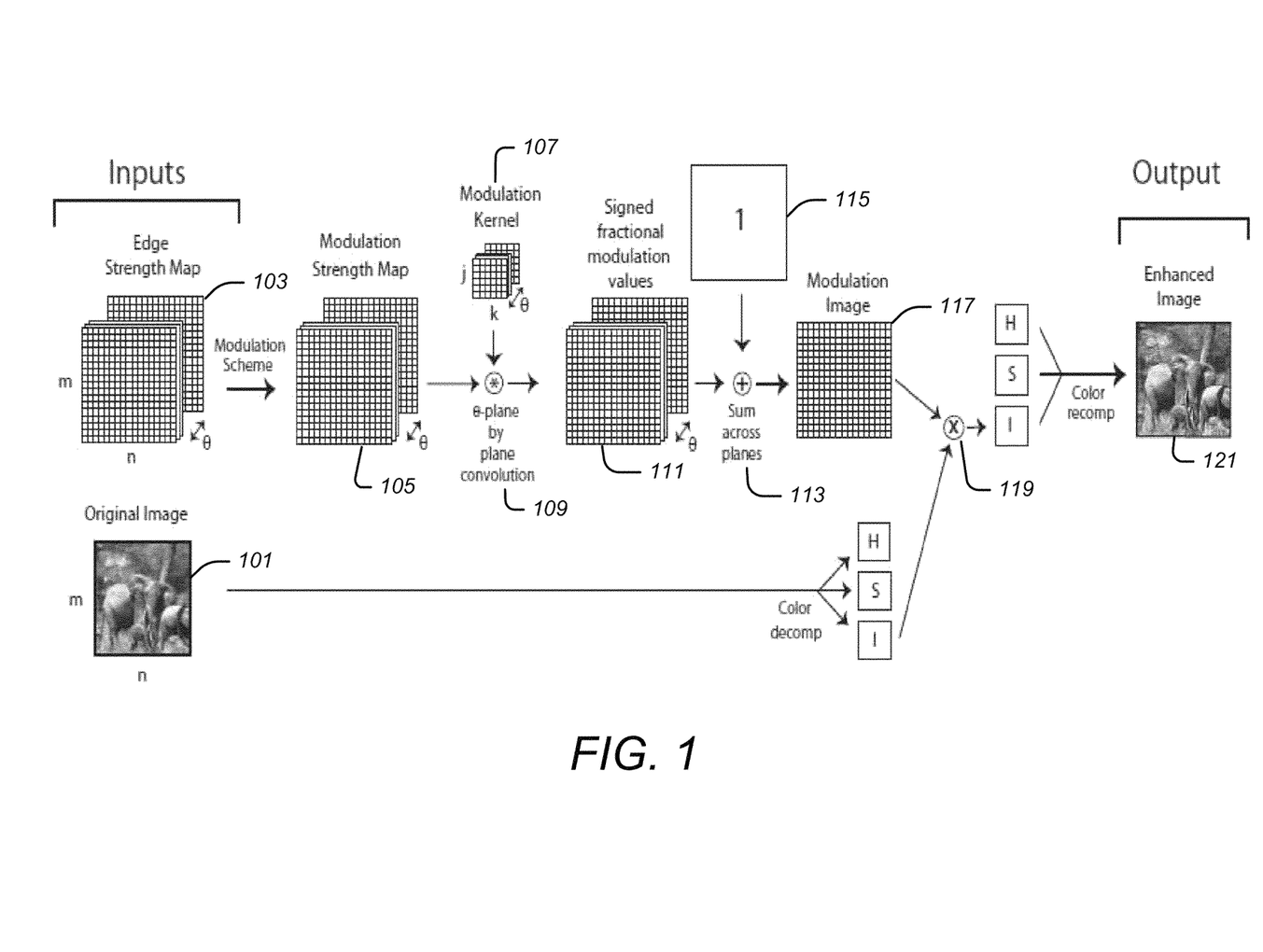
FIG. 1 is a flowchart illustrating an example of an image enhancement process.

FIG. 1 is a flowchart illustrating an example of an image enhancement process. An image enhancement system may implement this or a different process. Examples of steps that may be followed in this process are now discussed. A different set of steps or a different order may be used instead.

Image data may be loaded into an image enhancement system. The image data may be representative of an image 101 and may have originated from any of several sources, such as a camera, document scanner, medical imaging device, satellite imager, and/or another type of spatial sensor array. The image data may be digitized versions of hand drawn pictures, or artificial images such as produced by computer graphics programs or computer-based graphical design tools. The image data may be arrays of data that have a spatial interpretation and include meaningful regions separated by boundaries.

The image may be an individual, still image or part of a series of images that form a video. Other images in the video may be processed in the same way.

The image data may comprise values at multiple locations in the image, such as at each pixel in the image. The image data may contain one or more channels of information, such as RGB (color) images or multispectral images. The algorithms that are discussed below refer to modulation of a single channel extracted from the image, such as the intensity channel, or some other channel which could be a raw channel (e.g. the red value in an RGB image) or a combination or transformation of original image channels, such as a red-green opponent channel or hue or saturation channels.

The examples discussed below refer to standard 3-channel color images. The intensity channel may be extracted and modulated, and the image may then be reconstituted using the modified intensity channel. Had the image instead been a greyscale image, the process may have operated directly on the image pixels, without need for the multi-channel decomposition and recomposition steps.

Edge Strength Map (ESM)

As shown in FIG. 1, the image 101 in the form of image data may be received. Additionally, an edge strength map (ESM) 103 may be received. The ESM 103 may represent the edge strength at each of multiple orientations at each location in the image 101. The ESM 103 may have the same width and height dimension as the original image, i.e. may have the same number of image locations. The ESM 103 may include a depth dimension that accommodates multiple image-sized planes indexed by edge orientation ($\theta$).

Figure 3:
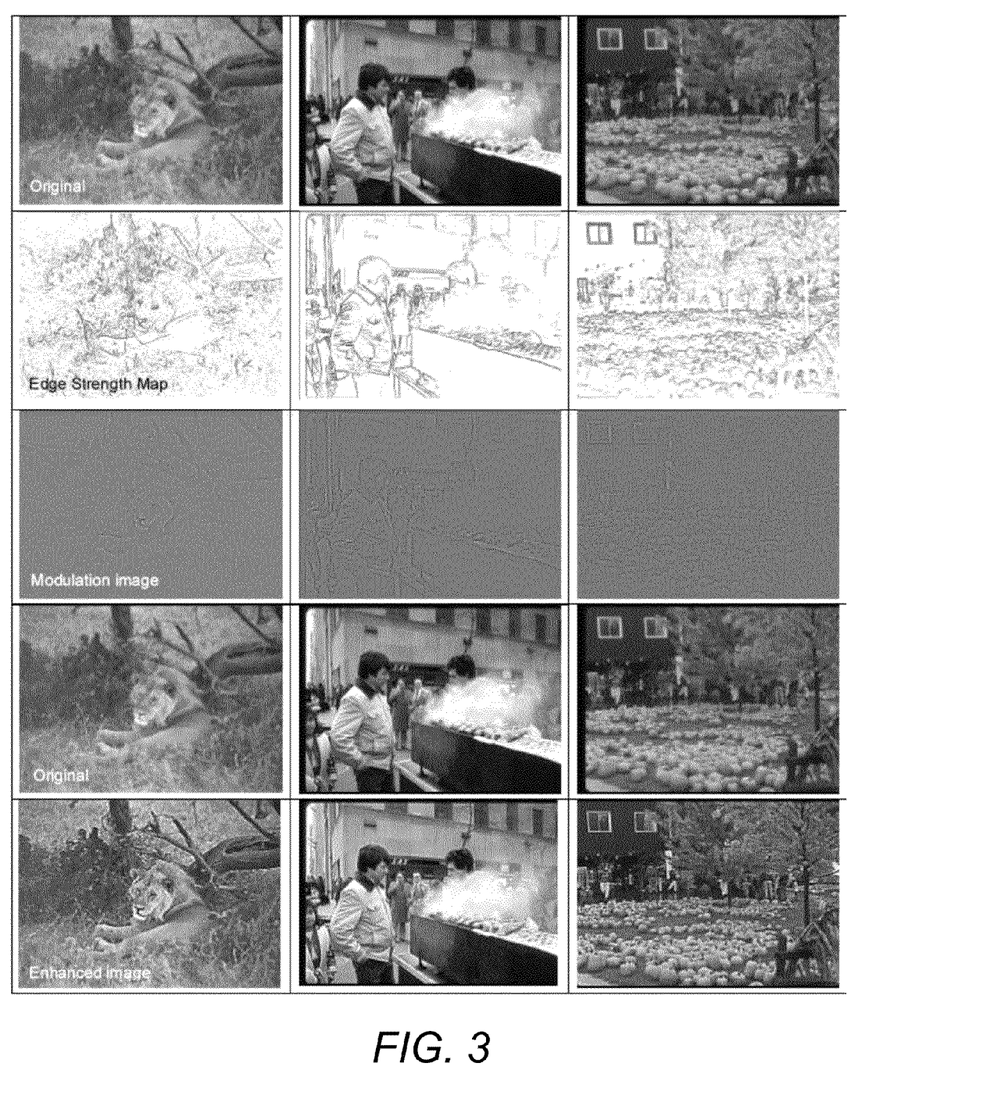
FIG. 3 illustrates examples of original images and for each, an associated edge strength map (used directly as a modulation strength map in the example), a modulation image, and an enhanced image.

FIG. 3 illustrates examples of original images and, for each, an associated edge strength map (used directly as a modulation strength map in the example), a modulation image, and an enhanced image. The edge strength map is rendered by showing a pixel at each location whose darkness level indicates the maximum value of edge strength in all the orientation planes associated with that pixel. In the examples of processed images shown in FIG. 3, 16 orientation planes were used, from 0 to 337.5° in equal steps of 22.5°. More or fewer orientation planes could have been used. More planes, if available, may lead to better results, as this may allow the edge detector to be better tuned in orientation. A similar point is made about having more image pixels, which allows the processing to occur at higher resolution. If too few orientation plan The value stored in each entry in the ESM in the examples shown here were calculated by a particular edge detection algorithm, and represented the probability ranging from 0 to 1 that an local object boundary existed at that location and orientation in the image. Alternatively, the ESM value could have represented the strength of the response of any of a large number of different oriented edge detection filters, leading to similar results. The more reliable the edge detection, and the more precise the tuning of the edge detector in position and orientation, the better the image modulation results may be.

Generating Modulation Strength Map (MSM)

The ESM 103 may represent the strength of the edge measurement at a given location/orientation, or the strength of the belief than an edge exists at that location/orientation, as discussed above.

A modulation strength map (MSM) 105 is a second data structure that may be generated from the ESM 103. The MSM 105 may specify how much image modulation is to be applied to the image at each orientation at each location. The MSM 105 can contain positive values, indicating that the edges at those particular locations/orientations should be boosted, that is, the contrast across the oriented boundary should be increased. It can also contain negative values indicating that oriented contrast at those locations/orientations should be suppressed.

In the example shown in FIG. 3, the MSM was equal to the ESM, so that stronger edges were boosted proportionally more than weak edges and no edges were suppressed. Where the MSM is equal to the ESM, then the oriented edge information provided as input to the system can be viewed as having been directly loaded into the MSM. In this case, the ESM stage exists but is implicit: the existence of an MSM containing modulation values in a systematic relationship to edges present in the original image implies that an ESM exists, or an MSM containing values in a systematic relation to image edge locations/orientations could not have been generated.

In general, any number of mappings from an edge strength value E to a modulation strength value M could be used, including:

- A linear function $M=AE+B$, where A is a scaling factor and B is an offset
- A more complex polynomial function such as $M=AE^2+BE+C$, where A, B, and C are constants, which would tend to exaggerate stronger edges
- A decelerating function such as $M=\sqrt{E}$, such that the modulation value begins to saturate for stronger edges
- An S-shaped, or sigmoidal, function such as $M=1/(1+\exp(-(E-t)/s)$, where t is a threshold and s is a steepness parameter, which would leave weak edges relatively unaffected, and saturate the modulation level for stronger edges, or
- A non-monotonic function of E, such as an upside-down U-shaped function like $\sin(\pi E)-0.5$, which would boost medium-strength edges, while actively suppressing weak and strong edges.

In addition to these general mappings from E to M values, the mapping can also take into account orientation. For example, positive modulation values could be assigned to vertical or near vertical edges, and negative values could be assigned to horizontal or near horizontal edges to emphasize vertical and de-emphasize horizontal structures in the image.

Modulation Kernel

A modulation kernel 107 instantiated for each orientation maybe convolved in a step 109 with the corresponding orientation plane of the MSM. The kernel represents the spatial pattern of boosting/suppression that may be effected centered at and in the vicinity of each location at each orientation, scaled by the corresponding value of M. To achieve this, the modulation kernel 107 instantiated for each orientation $\theta$ is convolved with the corresponding orientation plane of the MSM.

FIGS. 2A-2D illustrate examples and perceptual effects of oriented, bipolar decaying modulation kernels for enhancing borders. FIG. 2E provides examples of what has just been discussed. An equation is also presented below.

The results may then be summed across all orientations at each pixel in a step 107 to yield net signed fractional modulation values 111, one at each pixel. Net positive values may indicate pixels whose values will be boosted, and net negative values may indicate pixels whose values will be suppressed. These net signed fractional modulation values may then be added to an image 115 containing all 1's in a step 113 to produce an unsigned modulation image 117 (where the value 1 indicates no modulation) appropriate for scaling the original image values. Examples of this are illustrated in FIG. 3C.

Modulation Kernels of Different Forms

In some applications, the purpose of the oriented modulation kernels may be to alter the actual or perceived contrast across boundaries that have been detected in the image during the edge-detection pre-processing stage. Modulation kernels may in these applications be bipolar in structure, with positive coefficients that increase image values on one side of the oriented border, and negative coefficients that reduce image values on the other side of the border. If the kernel is signed such that positive coefficients are applied to the side of the border whose image values are initially larger, such as the brighter side of an edge, the effect of the kernel may be to brighten the bright side and darken the dark side of the edge. This may lead to a more prominent border and greater perceived contrast between the surfaces abutting the two sides of the edge. If the kernel is oppositely signed, such as effectively occurs when the value of M is negative, then border contrast may be reduced by brightening the dark side of the edge and dimming the bright side. In this way, some borders can be enhanced, and others attenuated.

Figure 2A:
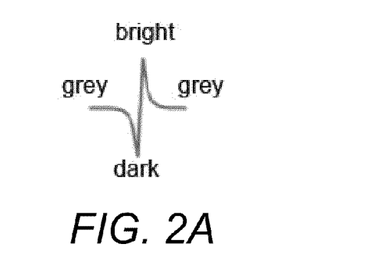
FIGS. 2A-2D illustrate examples and perceptual effects of oriented, bipolar decaying modulation kernels for enhancing borders.
Figure 2B:
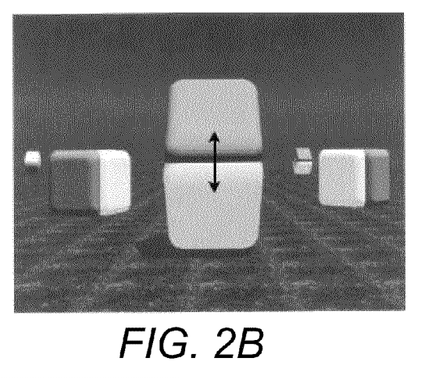
Figure 2C:
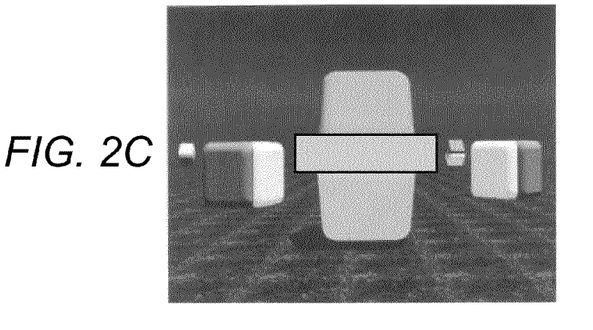
Figure 2D:
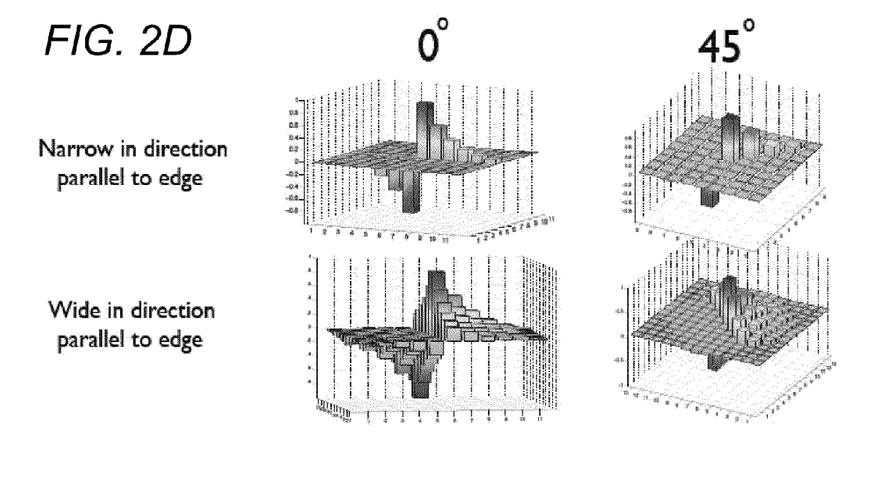

Based on the Cornsweet illusion (Cornsweet T. (1970) Visual Perception, New York: Academic Press, 1970), the kernel value may be bipolar, having peak positive and negative values immediately on either side of the edge, and decaying asymptotically on an exponential-like curve moving perpendicularly away from the edge. A 1-dimensional profile of this form is shown in FIG. 2A. The perceptual effect of modulating a border in this way is illustrated in FIGS. 2B and 2C, in an illusion created by R. Beau Lotto. FIG. 2D shows 2-dimensional instantiations of the oriented, bipolar, decaying modulation kernel function used here for θ=0 and 45 degrees, with varying settings. The function was defined as follows:

$$F(x, y) = \begin{cases} Ae^{-|x|S}e^{-yD} & W \geq x \geq 0; -E/2 \leq y \leq E/2 \\ -Ae^{-|x|S}e^{-yD} & -W \leq x < 0; -E/2 \leq y \leq E/2 \end{cases}$$

where,
A: Overall amplitude of the kernel
W: Width of the kernel in pixels in the direction perpendicular to the edge
S: Spatial decay constant perpendicular to the edge
E: Length of the kernel in pixels in the direction parallel to the edge
B: Spatial decay constant parallel to the length of the edge
The kernel was rotated in the plane to generate instantiations at different values of q.

Modulating Image

In the examples shown in FIG. 3, the modulation image multiplied the intensity channel of the original image to produce the enhanced image shown. Where the multiplied values exceeded the maximum allowable image value, the values were clipped to the maximum. This multiplication is shown in FIG. 1 as a step 119, yielding an enhancement image 121.

A variant of this approach may eliminate the need for clipping for values that would otherwise exceed the maximum allowable value. With this approach, the modified image value resulting from the scaling operation may be passed through a compressive nonlinearity so that the maximum allowable image value is never exceeded.

In general, the operation used to modulate image values using the value in the modulation image should share the property with multiplication that larger image values are generally modulated more than smaller image values up to the limits imposed by having a maximum allowable image value, but where a direct proportionality between the original image value and the modulated image value is not required.

Variations

The image processing approach described above may be applied to a single type of edge feature at a single spatial scale. The approach may incorporate:

Multiple edge types. A different ESM can be provided for each different type of edge in an image. Each different ESM may utilize a scheme that is optimized for its type of edge. Each different ESM may be processed with a correspondingly different MSM and modulation kernel. This allows for different modulation strategies for different types of edges, such as occluding boundaries, planar boundaries, and shadow boundaries. For example, it may be desirable to enhance occluding boundaries and planar boundaries, but to suppress shadow boundaries. Similarly, different ESMs can be provided for edges with different local curvature, so that straight edges can be modulated differently than curved edges, both by using different values in their respective MSMs, and by using differently shaped modulation kernels that track the edge curvature. For example, in certain types of images, this may help emphasize architectural structures while suppressing natural foliage.

More complex feature types. Features such as L-junctions that conjoin two local edges at different orientations, or more complex features that conjoin more edge components, can be handled by including more parameter planes that are indexed by multiple θ, parameters rather than just one. Modulation kernels may also be specialized in shape for different complex feature types, as they would be for curves (see multiple edge types explanation above), so that border contrast is appropriately modulated.

Modulation at multiple scales. Natural boundaries may have a different structure at different spatial scales. For example, the outline of a tree typically has one orientation at a coarse scale (of the canopy), and different, rapidly varying orientations at a fine scale (of leaves). The above described approach to modulating pixels based on edge information allows for modulations to be combined across scales, such as by modulating the original image separately and serially, one scale at a time. It would thus be possible, for example to increase the salience of the canopy contour, while attenuating the detailed leaf contours.

Figure 4:
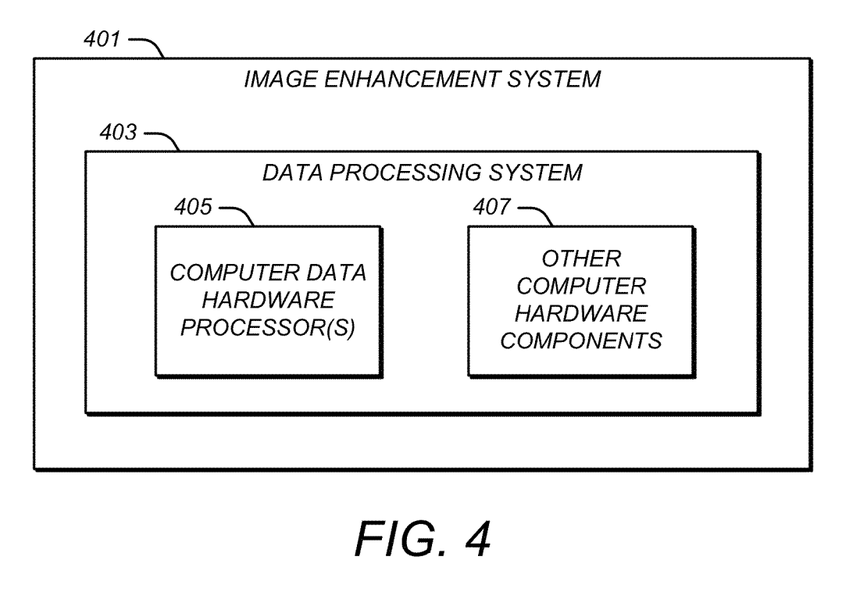
FIG. 4 is an example of an image enhancement system.

FIG. 4 is an example of an image enhancement system 401. As illustrated in FIG. 4, the image enhancement system 401 may include a data processing system 403 containing one or more computer data hardware processors 405 and other computer hardware components 407, such as one or more tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The data processing system 403 may be configured to perform one, all, or any combination of the functions that have been described above and/or in the claims below, such as the process illustrated in FIG. 1 and described above.

The data processing system 403 may be a desktop computer or a portable computer, such as a laptop computer, a notebook computer, a tablet computer, a PDA, a smartphone, or part of a larger system, such a vehicle, appliance, and/or telephone. The data processing system may include one or more computers at the same or different locations. When at different locations, the computers may be configured to communicate with one another through a wired and/or wireless network communication system.

The data processing system 403 may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the data processing system 403, as recited herein. The description of each function that is performed by the data processing system 403 also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

Figure 5:
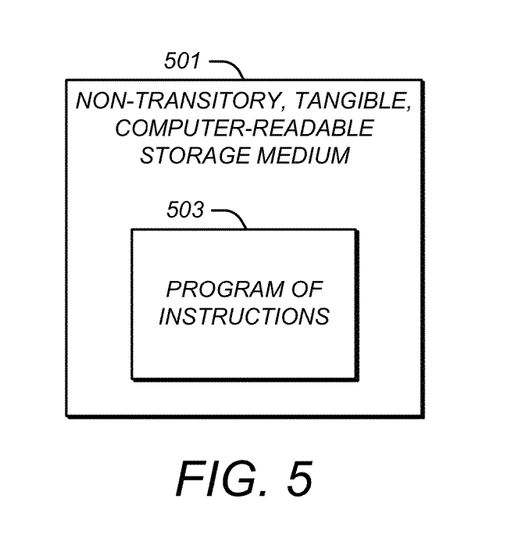
FIG. 5 is an example of a storage medium containing a program of instructions.

FIG. 5 is an example of a non-transitory, tangible, computer-readable storage medium 501 containing a program of instructions 503. The program of instructions may cause the data processing system 503 to perform the functions of the data processing system 503 as described above, when loaded in and run by the data processing system 503.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, the system may not use very high magnitude modulation values and or values in the modulation kernel, such that, where edges are indicated to exist in the ESM, original image values are systematically scaled past their allowable limits at the modulation step, so that, after clipping to maximum allowed values (for example, 255 in an 8-bit digital image), or rounding to the nearest value on the low end (for example, 0 in an 8-bit digital image) the resulting values surrounding the edge are homogenized to the minimum and maximum allowable values. In this configuration, the original image values may have effectively been overwritten. If 0 is interpreted as black, and 255 is interpreted as white, then the perceptual effect may be to have applied a black line or band on one side of the edge and a white line or band on the other side. Similarly, if a way were found to use the modulation kernel and modulation values so that image values in the vicinity of edges were systematically homogenized to other values that were not the minimum or maximum values, so that original image pixels in the vicinity of edges were effectively replaced by "paint" of different values, such as 100 and 200 in the above example, this might also be excluded.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An image enhancement system comprising a computer data processing system that includes at least one computer data hardware processor and other computer hardware components that, in connection with a modulation strength map (MSM) that contains positive or negative values representing a sign and magnitude of modulation to be applied in the vicinity of each of multiple locations in an image at each of multiple orientations for each of the locations, each of the multiple orientations at each of the multiple locations having an image value, collectively:

generate a net signed fractional modulation value at each of the locations in the image using the MSM in combination with a modulation kernel $F(\theta)$, the generating being done in accordance with the following algorithm:
   at a given location X in the image, and for a given orientation $\theta$, the modulation strength M represented in the MSM is used to scale $F(\theta)$;

at every image location, positive and negative contributions are accumulated from all scaled modulation kernels arising from surrounding image locations/orientations, in order to produce a net signed fractional modulation value that represents a fractional increase or decrease to be applied to the image value at that location; and scale an image value at each location using the net signed fractional modulation value at each location, wherein application of the algorithm does not result in systematic clipping of peri-edge locations to maximum or minimum brightness values, or any other form of systematic homogenization of values at peri-edge locations.

2. The image enhancement system of claim 1 wherein the modulation kernel is an oriented bipolar function whose values change sign at the border of orientation θ that runs through the kernel center, but are primarily of the same sign on each side of the border.

3. The image enhancement system of claim 2 wherein the modulation kernel is an oriented bipolar function whose values are peaked on either side of the border of orientation θ that runs through the kernel center, and decay smoothly moving perpendicularly away from the border.

4. The image enhancement system of claim 3 wherein the values of the modulation kernel decay smoothly along an uninflected asymptotic curve moving perpendicularly away from the border.

5. The image enhancement system of claim 1 wherein the modified image values produced by scaling the original image values by the net signed fractional modulation value are clipped or compressed so that no resulting value exceeds a maximum allowable image value.

6. The image enhancement system of claim 1 wherein the system generates the MSM from an edge strength map (ESM) that represents edge strength at each of the multiple orientations at each of the multiple locations by non-monotonic mapping from edge strength to modulation strength.

7. The image enhancement system of claim 1 wherein the signed fractional modulation values are computed separately at multiple spatial scales for the same image, after which the original image values are modified based on the modulation values combined across spatial scales.

8. The image enhancement system of claim 1 wherein:
the system generates the MSM from an edge strength map (ESM) that represents edge strength at each of the multiple orientations at each of the multiple locations;
the image has different types of edges; and
a different set of ESMs, MSMs, and modulation kernels are used in the scaling step to scale the locations that comprise each different type of edge.

9. The image enhancement system of claim 1 wherein:
the value at each location represents brightness, hue, or saturation; and
the scaling scales the brightness, hue, or saturation values.

10. A non-transitory, tangible, computer-readable storage medium containing a program of instructions that cause a computer data processing system that includes at least one computer data hardware processor and other computer hardware components running the program of instructions, in connection with a modulation strength map (MSM) that contains positive or negative values representing a sign and magnitude of modulation to be applied in the vicinity of each of multiple locations in an image at each of multiple orientations for each of the locations, each of the multiple orientations at each of the multiple locations having an image value, to:
generate a net signed fractional modulation value at each of the locations in the image using the MSM in combination with a modulation kernel $F(\theta)$, the generating being done in accordance with the following algorithm:
at a given location X in the image, and for a given orientation θ, the modulation strength M represented in the MSM is used to scale $F(\theta)$;
in the scaled result, centered at location X, positive values indicate locations relative to X that are to be increased in value and by how much, and negative values indicate image locations relative to X that are to be decreased in value and by how much; and
at every image location, these positive and negative contributions are accumulated from all of the scaled modulation kernels arising from surrounding image locations/orientations, in order to produce a net signed fractional modulation value that represents the fractional increase or decrease to be applied to the image value at that location; and scale an image value at each location using the net signed fractional modulation value at each location, wherein application of the algorithm does not result in systematic clipping of peri-edge locations to maximum or minimum brightness values, or any other form of systematic homogenization of values at peri-edge locations.

11. The storage medium of claim 10 wherein the modulation kernel is an oriented bipolar function whose values change sign at the border of orientation θ that runs through the kernel center, but are primarily of the same sign on each side of the border.

12. The storage medium of claim 11 wherein the modulation kernel is an oriented bipolar function whose values are peaked on either side of the border of orientation θ that runs through the kernel center, and decay smoothly moving perpendicularly away from the border.

13. The storage medium of claim 12 wherein the values of the modulation kernel decay smoothly along an uninflected asymptotic curve moving perpendicularly away from the border.

14. The storage medium of claim 10 wherein the modified image values produced by scaling the original image values by the net signed fractional modulation value are clipped or compressed so that no resulting value exceeds a maximum allowable mage value.

15. The storage medium of claim 10 wherein the system generates the MSM from an edge strength map (ESM) that represents edge strength at each of the multiple orientations at each of the multiple locations by non-monotonic mapping from edge strength to modulation strength.

16. The storage medium of claim 10 wherein the signed fractional modulation values are computed separately at multiple spatial scales for the same image, after which the original image values are modified based on the modulation values combined across spatial scales.

17. The storage medium of claim 10 wherein:
the system generates the MSM from an edge strength map (ESM) that represents edge strength at each of the multiple orientations at each of the multiple locations;
the image has different types of edges; and
a different set of ESMs, MSMs, and modulation kernels are used in the scaling step to scale the locations that comprise each different type of edge.

18. The storage medium of claim 10 wherein:
the value at each location represents brightness, hue, or saturation; and
the scaling scales the brightness, hue, or saturation values.

* * * * *